United States Patent
Largiller et al.

(10) Patent No.: US 12,472,574 B2
(45) Date of Patent: Nov. 18, 2025

(54) METHOD FOR JOINING, BY DIRECT BRAZING, A FIRST PART AND A SECOND PART, INCLUDING STEPS OF PREPARING THE SURFACE OF AT LEAST ONE OF THE PARTS

(71) Applicant: COMMISSARIAT À L'ÉNERGIE ATOMIQUE ET AUX ÉNERGIES ALTERNATIVES, Paris (FR)

(72) Inventors: Grégory Largiller, Grenoble (FR); Philippe Emonot, Grenoble (FR); Rayisa Voytovych, Echirolles (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/260,803

(22) PCT Filed: Jan. 10, 2022

(86) PCT No.: PCT/FR2022/050053
§ 371 (c)(1),
(2) Date: Jul. 10, 2023

(87) PCT Pub. No.: WO2022/148941
PCT Pub. Date: Jul. 14, 2022

(65) Prior Publication Data
US 2024/0075546 A1    Mar. 7, 2024

(30) Foreign Application Priority Data
Jan. 11, 2021  (FR) ...................................... 2100219

(51) Int. Cl.
*B23K 1/00*    (2006.01)
*B23K 1/20*    (2006.01)
(Continued)

(52) U.S. Cl.
CPC ............ *B23K 1/206* (2013.01); *B23K 35/262* (2013.01); *B23K 2103/172* (2018.08); *B23K 2103/18* (2018.08); *B23K 2103/50* (2018.08)

(58) Field of Classification Search
CPC ........ B23K 1/0008; B23K 1/002; B23K 1/19; B23K 1/20; B23K 1/206; B23K 2103/14;
(Continued)

(56) References Cited

U.S. PATENT DOCUMENTS

| 4,468,309 A | 8/1984 | White |
| 6,528,123 B1 | 3/2003 | Cadden et al. |

(Continued)

FOREIGN PATENT DOCUMENTS

| CN | 103352222 A | 10/2013 |
| FR | 3095151 A1 | 10/2020 |
| GB | 2137131 A | 10/1984 |

OTHER PUBLICATIONS

International Search Report for PCT/FR2022/050053 dated Apr. 20, 2022.
(Continued)

*Primary Examiner* — Erin B Saad
(74) *Attorney, Agent, or Firm* — Chrisman Gallo Tochtrop LLC

(57) ABSTRACT

A method for joining, by brazing, a first part and a second part, the steps of preparing at least one of the parts including the following: a) providing a part intended to be brazed, the part being made of carbon or based on titanium, nickel or a CoCr alloy, b) performing inert gas plasma treatment on the part whereby the part is cleaned and an active surface is formed on the part, c) depositing a first layer comprising an active element on the active surface of the part, the active element being a carbide-forming element, d) depositing a
(Continued)

second layer of gold on the first layer, whereby the first layer is protected from oxidation and good wetting is ensured.

13 Claims, 3 Drawing Sheets

(51) Int. Cl.
*B23K 35/26* (2006.01)
*B23K 103/00* (2006.01)
*B23K 103/16* (2006.01)
*B23K 103/18* (2006.01)

(58) Field of Classification Search
CPC ............... B23K 2103/26; B23K 31/02; C23C 14/0605; C23C 16/0245; C23C 16/0254; C23C 16/52; C23C 28/00
See application file for complete search history.

(56) References Cited

U.S. PATENT DOCUMENTS

| | | | | |
|---|---|---|---|---|
| 8,842,950 | B2* | 9/2014 | DeWit | G02B 6/262 |
| | | | | 385/39 |
| 9,981,317 | B2* | 5/2018 | McClymont | C30B 29/04 |
| 2014/0119693 | A1* | 5/2014 | DeWit | G02B 6/4267 |
| | | | | 359/894 |
| 2016/0144460 | A1 | 5/2016 | Burda et al. | |
| 2016/0250691 | A1* | 9/2016 | Mcclymont | C30B 29/04 |
| | | | | 29/557 |
| 2019/0013212 | A1* | 1/2019 | Matsuura | H05K 1/09 |
| 2019/0029125 | A1* | 1/2019 | Matsuura | H05K 3/205 |
| 2023/0226630 | A1* | 7/2023 | Arakawa | C04B 37/02 |
| | | | | 279/128 |
| 2024/0075546 | A1* | 3/2024 | Largiller | B23K 1/20 |

OTHER PUBLICATIONS

Written Opinion for PCT/FR2022/050053 dated Apr. 20, 2022.
Li, Wen-Chung et al. "Interfacial Segregation of Ti in the Brazing of Diamond Grits onto a Steel Substrate Using a Cu—Sn—Ti Brazing Alloy", Metallurgical and Materials Transactions A, vol. 33A (2002) 2163-2172.
Liu, Duo et al. "Brazing of CIC composite and Ti—6Al—4V with graphene strengthened AgCuTi filler: Effects of graphene on wettability; microstructure and mechanical properties", Chinese Journal of Acronautics, 31(7), (2018), 1602-1608).
Yu, Wei-yuan et al. "Interface reaction in ultrasonic vibration-assisted brazing of aluminium to graphite using Sn—Ag—Ti solder foil", Journal of Materials Processing Technology 221 (2015) 285-290).
Song, X.G. et al. "A novel metallisation process for soldering graphite to copper at low temperature", Journal of Alloys and Compounds 696 (2007) 1199-1204).

* cited by examiner

METHOD FOR JOINING, BY DIRECT BRAZING, A FIRST PART AND A SECOND PART, INCLUDING STEPS OF PREPARING THE SURFACE OF AT LEAST ONE OF THE PARTS

CROSS-REFERENCE TO RELATED APPLICATIONS

This is a National Stage application of PCT international application PCT/FR2022/050053, filed on Jan. 10, 2022, which claims the priority of French Patent Application No. FR 2100219, filed Jan. 11, 2021, both of which are incorporated herein by reference in their entirety.

TECHNICAL FIELD

The present invention relates to the general field of brazing and more particularly to a method for preparing the surface of a part intended to be assembled by brazing. The part may be made of titanium, nickel, CoCr or carbon, for example, pyrolytic carbon, graphite or a C/C composite coated with pyrolytic carbon, or vitreous carbon.

The invention also relates to a method for direct brazing of a part thus prepared and of another part.

The invention is particularly interesting since it enables direct assembly by soft brazing (typically for temperatures lower than 450° C.) two parts using non-active solders.

The invention finds applications in the field of implants, for example prostheses.

PRIOR ART

Conventionally, brazing a part made of carbon with a metal part is carried out at relatively high temperatures (in particular at temperatures higher than 800° C.). As examples, the following heterogeneous assembly processes are known:
- a diamond part and a steel part assembled with a Cu-10Sn-15Ti solder at 925° C. and at 1050° C. (Li et al. "*Interfacial Segregation of Ti in the Brazing of Diamond Grits onto a Steel Substrate Using a Cu—Sn—Ti Brazing Alloy*", Metallurgical and Materials Transactions A 33A (2002) 2163-2172);
- a C/C composite and a titanium part assembled with solders commercialized under the references Cu-ABA (92.8Cu-3Si-2Al-2.25Ti %). TiCuNi (70Ti-15Cu-15Ni) and TiCuSil (68.8Ag-26.7Cu-4.5Ti) at brazing temperatures comprised between 920 and 1050° C. under vacuum (Singh et al., "*Active metal brazing and characterisation of brazed joints in titanium to carbon-carbon composites*", Materials Science and Engineering A 412 (2005) 123-128);
- a C/C composite assembled to a metal part made of Ti-6Al-4V with an AgCuTi solder at 880° C. (Liu et al. "*Brazing of CIC composite and Ti-6Al-4V with graphene strengthened AgCuTi filler: Effects of graphene on wettability; microstructure and mechanical properties*", Chinese Journal of Acronautics, 31(7), (2018), 1602-1608);
- a C/C composite assembled to a titanium-based metal part (TA6V) (WO 2007/066051 A2) using interlayers made of ceramic (for example of tungsten or of aluminium nitride) to reduce the stresses resulting from the differential expansion between the parts, and a solder of the Ag—Mn type (whose melting point is higher than 961° C.) or of the AgCuTi type (whose liquidus is higher than 815° C.); considering the melting temperatures of the solders, the brazing temperatures are certainly higher than 800° C.

However, to avoid the strong thermomechanical stresses that appear in solid parts during the assembly of a part made of carbon and a metal part and not to damage the materials to be assembled, it is sometimes necessary to carry out the assembly at a lower temperature.

For example, in document US 2016/0144460 A1, tin-based alloys, such as Sn—Ag—Cu—Cr, Sn—Ag—Cu, or Sn—Ag—Cu—Ni are used for brazing carbon nanotubes to an element made of copper. In order not to damage the carbon nanotubes by the liquid alloy, the method is carried out at temperatures lower than 700° C. This method is used to make devices with small dimensions, herein electrical components. Such devices involve low deformations and therefore low thermomechanical stresses. In addition, brazing is facilitated by the use of copper which is very ductile. Since the tin-based alloy oxidises easily in air and the presence of oxide results in poor wetting of the brazing alloy, the method should be carried out using a flux (of acids, solvents, etc.) to eliminate the oxides in air and/or in a protective atmosphere with a reduced oxygen content (inert atmosphere, reducing atmosphere, vacuum). However, such constraints complicate the implementation of the method.

In the article by Yu et al. ("*Interface reaction in ultrasonic vibration-assisted brazing of aluminium to graphite using Sn—Ag—Ti solder foil*", Journal of Materials Processing Technology 221 (2015) 285-290), SnAgTi type solders are used to braze aluminium with graphite. The brazing is carried out at 500° C. in air, by applying ultrasonic vibrations to destroy the oxide films at the surface of the solder and the aluminium and to improve wettability. The mechanical behaviour of the assembly is not studied. However, the use of ultrasounds complicates the implementation of the method.

Another possible way to braze ceramics at low temperature is to carry out a metallisation of the non-wettable components with a coating, which process includes a high-temperature annealing. This approach has been widely used for several decades to braze alumina.

For example, the most widespread alumina metallisation technique consists in applying a mixture of Mo and Mn powders and then carrying out a heat treatment at high temperature (>1400° C.) to form a vitreous phase. Afterwards, this coating is covered with a 2 to 10 µm layer of Ni or Cu which then enables conventional brazing by non-active solders. This so-called "moly-manganese" technique is not applicable for carbon parts.

In the document U.S. Pat. No. 6,528,123 B1, the authors carry out the metallisation of a ceramic (alumina or SiC) by depositing a sub-micronic layer of an active element (Ti, Zr, Cr, V, etc.) by PVD deposition then by depositing a thicker layer of a non-active element (Au, Cu, Ni, Ag, Pd, In or Mo). Afterwards, the parts thus metallised are annealed at high temperature (>900° C.) to ensure a good adhesion of these layers to the part made of ceramic.

As regards metallisation of carbon parts, current knowledge is very limited. Nevertheless, mention may be made of the work of Song et al. ("A novel metallisation process for soldering graphite to copper at low temperature", Journal of Alloys and Compounds 696 (2007) 1199-1204). Their method consists in applying a powder of Sn0.3Ag0.7Cu-9% Cr with a thickness of about 50 µm, over parts made of graphite then carrying out a heat treatment at 950° C. for 30 min to create a layer wettable by the non-active solders. Afterwards, assembly with copper has been carried out at 250° C. using the Sn3Ag0.5Cu solder paste in air on parts with small dimensions (20 mm×10 mm×3 mm). The drawback of this method is that the deposition step is carried out in two steps and that it would require reworking the metallised surface by polishing.

DISCLOSURE OF THE INVENTION

The present invention aims to provide a method for preparing the surface of a part made of carbon (in particular, of pyrolytic carbon, of graphite or a C/C composite covered with pyrolytic carbon, or vitreous carbon) or titanium-based, nickel-based or made of CoCr that is simple and inexpensive to implement, this part being intended to be assembled by brazing with another part at temperatures lower than 450° C., using non-active solders, without using any intermediate material, fluxing or ultrasonic vibrations, the obtained assembly should have a good mechanical strength and a long service life.

For this purpose, the present invention provides a method for preparing the surface of a part intended to be assembled with another part by brazing, comprising the following steps:
  providing a part intended to be brazed, the part being made of carbon, preferably, of pyrolytic carbon, of graphite or of a C/C composite coated with pyrolytic carbon, or of vitreous carbon, or titanium-based, nickel-based or made of CoCr,
  b) carrying out a plasma treatment with a neutral gas, on the part, whereby the part is cleaned and an active surface is formed over the part,
  c) depositing a first layer of an active element (called the adhesion layer) over the active surface of the part, the active element being a carbide-forming element; the surface activation carried out in step b) resulting in a better adhesion of the metallic adhesion layer,
  d) depositing a second layer made of gold over the first layer, whereby the first layer is protected from oxidation.

The invention differs from the prior art essentially by the implementation of particular steps in order to prepare the surface of the part to be assembled.

Thus, it is possible afterwards to assemble the part with another part at an assembly temperature lower than 350° C., and preferably lower than 320° C.

The proposed method allows obtaining a good wetting at such temperatures, and a better mechanical response. The decrease in the thermal amplitude reduces the thermomechanical stresses.

The preparation method according to the invention allows durably assembling parts of different dimensions, and in particular solid parts resistant to mechanical stress. The parts thus assembled have strong interfaces and a good mechanical strength despite the difference in thermomechanical behaviour between, for example, a part made of carbon and a metal part titanium-based, nickel-based or made of CoCr.

Advantageously, the active element is Ti, Cr or Zr.

Advantageously, the first layer has a thickness of 300 μm to 500 μm.

According to a first advantageous variant, the method comprises a step e), between step c) and step d), during which a third layer of a non-active element is deposited. Thus, a stack of three layers is obtained comprising, from the active surface of the part: the first layer, the third layer and the second layer. The third layer acts as a diffusion barrier to the first layer.

Advantageously, the non-active element is W or Nb.

Advantageously, according to this variant, the first layer has a thickness of 30 to 50 nm and the third layer has a thickness of 100 to 500 nm.

According to a second advantageous variant, the first layer comprises, in addition to the active element, a non-active element, preferably W or Nb, deposited simultaneously with the active element during step c). Advantageously, such a layer comprises at least 40% by volume, and preferably at least 60%, of the active element in order to form a continuous phase of active element.

Advantageously, according to this variant, the third layer has a thickness of 50 to 100 nm.

For these two advantageous variants, the non-active element acts as a diffusion barrier and allows protecting the active element of the adhesion layer with respect to the solder. Indeed, the dissolution of the active element in the solder could lead to a loss of adhesion.

The invention also relates to a method for assembling a first part thus prepared with a second part by soft brazing (at a temperature lower than 450° C.).

The method for assembling a first part and a second part by brazing comprising the following steps:
  preparing a first part made of carbon (preferably pyrolytic carbon, graphite or a C/C composite covered with pyrolytic carbon, or vitreous carbon), titanium-based, nickel-based or made of a CoCr alloy according to the previously-described method,
  ii) preparing a second part made of carbon (preferably, pyrolytic carbon, graphite or a C/C composite covered with pyrolytic carbon, or vitreous carbon), titanium-based, nickel-based or made of a CoCr alloy,
  iii) bringing a filler material into contact with the first part and with the second part,
  iv) heating the assembly obtained in step iii) up to an assembly temperature higher than the melting temperature of the filler material, so as to melt the filler material, and keeping the assembly temperature for a hold time period, the assembly temperature being lower than 450° C.,
  v) cooling the assembly so as to form a solder joint between the first part and the second part, whereby the parts are assembled.

The first part and the second part may be identical or different.

According to a first particular embodiment, the second part provided in step ii) is, advantageously, prepared according to the preparation method as described before. In other words, said second part is covered with a stack comprising a first layer containing a carbide-forming element and a second gold layer. The stack may also comprise a third layer containing a non-active element, positioned between the first layer and the second layer. Alternatively, the first layer may comprise the non-active element. This first particular embodiment is particularly advantageous in the case of a second part made of carbon.

According to a second particular embodiment, preferably carried out, in the case of a second titanium-based, nickel-based or CoCr-based metal part, the second part may be prepared according to the following steps:
  a') carrying out a plasma treatment with a neutral gas, preferably argon, on the second metal part whereby the second metal part is cleaned and an active surface is formed over the second metal part,
  b') covering the active surface of the second metal part with a gold layer, preferably having a thickness of 50 to 100 nm, whereby the active surface is protected from oxidation and a good wetting is ensured.

This second particular embodiment is particularly advantageous in the case of a second metal part, for example, titanium-based or nickel-based or made of CoCr.

Advantageously, the filler material is tin or a tin-based alloy. It may consist of a binary tin-based alloy such as SnAg, SnCu or SnIn. It may also consist of a ternary tin-based alloy.

Preferably, the assembly temperature is lower than 350° C. (for example comprised between 250° C. and 350° C.), and still more preferably lower than 320° C. (for example comprised between 250° C. and 320° C.). The assembly temperature depends on the selected solder.

Advantageously, the first part is a graphite substrate covered with pyrolytic carbon and the second part is made of a CoCr alloy.

The method has numerous advantages:
- it does not require any step of high-temperature thermal annealing of the layers deposited over the part before assembly, unlike the method for preparing parts made of an oxide ceramic by PVD metallisation, for which the annealing step is necessary to ensure a good adhesion,
- it enables the assembly of carbon parts with a metal part at low temperature (<450° C.) without applying ultrasonic vibrations or using fluxing during the brazing operation,
- the brazing temperatures are lower than 350° C., and preferably lower than 320° C., which allows assembling solid parts having to withstand mechanical forces, despite a difference in thermal expansion of the parts to be assembled; such a difference generally results in high thermomechanical stresses during the assembly of a part made of carbon and a part of metal at high temperature (>800° C.),
- the assembly of such surfaces by brazing is direct and does not require the use of an intermediate material, like for example copper or molybdenum,
- it enables the assembly of two parts made of carbon by direct brazing with a non-active solder,
- the formed joints and the final assembly have a good mechanical strength.

Other features and advantages of the invention will arise from the following complementary description.

It goes without saying that this additional description is given only as an illustration of the object of the invention and should in no way be interpreted as a limitation of this object.

BRIEF DESCRIPTION OF THE DRAWINGS

The present invention will be better understood upon reading the description of embodiments given merely for indication and without limitation with reference to the appended drawings wherein.

Figure 1:
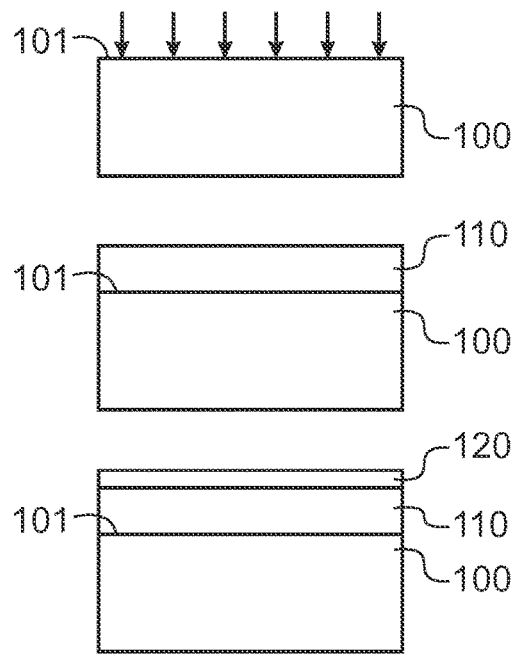
FIG. 1 schematically shows different steps of a method for preparing a part for brazing, according to a particular embodiment of the invention.

The different portions shown in the figures are not necessarily plotted according to a uniform scale, to make the figures more readable.

The different options (alternative embodiments and embodiments) should be understood as not being mutually exclusive and can be combined with one another.

Furthermore, in the description hereinafter, terms that depend on the orientation, such as "top", "bottom", etc., of a structure apply while considering that the structure is oriented as illustrated in the figures.

DETAILED DISCLOSURE OF PARTICULAR EMBODIMENTS

We will now describe in more detail the method for assembling a first part 100 with a second part 200 by brazing at temperatures lower than 450° C., using non-active solders, without using any intermediate material, fluxing or ultrasonic vibrations.

The first part 100 and/or the second part 200 may be metal parts, for example titanium-based, nickel-based or made of CoCr or parts made of carbon.

The part made of carbon (or carbon part) may be selected from among parts made of pyrolytic carbon, of graphite or of a C/C composite covered with pyrolytic carbon, or with vitreous carbon.

By titanium-based, it should be understood that the part comprises more than 50% by mass of titanium. It may consist of titanium or of a titanium alloy. For example, the titanium-based part may be made of Ti-6Al-4V (TA6V), Ti-6Al-7Nb, Ti-5Al-2.5Fe, Ti-13Nb-13Zr, Ti-12Mo-6Zr-2Fe, Ti35Nb-7Zr-5Ta, Ti-29Nb-13Ta-4.6Zr, Ti-35Nb-5Ta-7Zr-0.40, Ti-15Mo-5Zr-3Al, Ti—Mo or T40.

By nickel-based, it should be understood that the part comprises more than 50% by mass of nickel. It may consist of nickel or a nickel alloy. The nickel-based part may be made of an Inconel®, Monel®, or Hastelloy® alloy.

The part made of CoCr may be made of a UNS R30008 alloy.

The part(s) to be assembled may have dimensions of a few $mm^2$ to a few $cm^2$.

The method for assembling the first part 100 and the second part 200 comprises the following successive steps:
preparing the surface of the first part 100,
ii) preparing the surface of the second part 200,
iii) bringing a filler material 300 in contact with the first part 100 and with the second part 200,
iv) heating the assembly obtained in step iii) up to an assembly temperature higher than the melting temperature of the filler material 300, so as to melt the filler material 300, and keeping the assembly temperature for a hold time period, the assembly temperature being lower than 450° C., and preferably lower than 350° C., and still more preferably lower than 320° C.,
v) cooling the assembly so as to form a solder joint between the first part 100 and the second part 200, and to assemble them.

The method for preparing the first part 100 (step i) comprises the following steps (FIG. 1):
providing the first part 100 intended to be brazed,
optionally chemically cleaning the first part 100, for example in an ultrasonic tank with acetone and then ethanol, rinsing and drying,
carrying out a surface treatment of the first part 100 by ion etching by bombardment with neutral gas ions, preferably an argon plasma, where appropriate, to eliminate anything that persists after the chemical cleaning and activate the surface 101 of the first part 100 for a better adhesion of the first layer on the active surface 101,
depositing a first layer 110 (called adhesion layer) over the active surface 101 of the first part 100, the first layer 110 comprising an active carbide-forming element to create a good adhesion with the active carbon surface 101,
depositing a second layer of gold 120, preferably having a thickness of 50 to 100 nm to protect the first layer 110 from oxidation and ensure a good wetting during assembly by brazing.

By carbide-forming element, it should be understood an element which forms carbides. For example, such elements are zirconium, molybdenum, chromium, titanium, niobium and tungsten. Preferably, the adhesion layer is made of Ti, Cr or Zr. It could also consist of an alloy of these elements such as TiZr.

Preferably, the adhesion layer 110 has a thickness of 300 to 500 µm.

Figure 2:
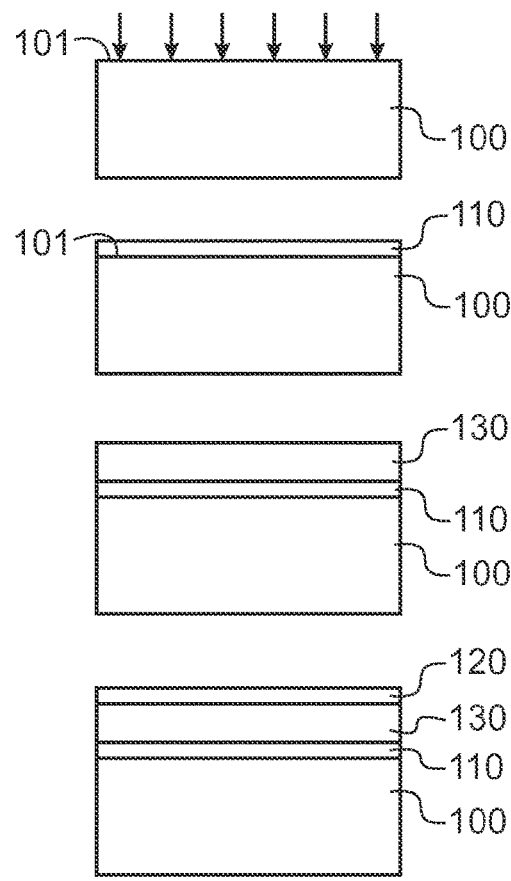
FIG. 2 schematically shows different steps of a method for preparing a part for brazing, according to another particular embodiment of the invention.

According to a variant shown in FIG. 2, a third layer 130 may be deposited between the adhesion layer 110 and the gold layer 120. This layer serves as a diffusion barrier.

The barrier layer 130 is made of a non-active element. For example, it may be made of W or Nb. It could also be made of nickel. According to this variant, the adhesion layer 110 advantageously has a thickness of 30 to 50 nm and the diffusion barrier layer 130 advantageously has a thickness of 100 to 500 nm.

According to another variant, it is possible to simultaneously deposit the carbide-forming active element and the non-active element. Advantageously, the first layer 110 thus obtained has a thickness of 100 to 500 nm. Preferably, the carbide-forming active element forms at least 40% by volume of the first layer 100 in order to form a continuous phase within the first layer 110.

The layers 110, 120 and/or 130 may be deposited by physical vapour deposition (or PVD), by chemical vapour deposition (or CVD), or else by plasma sputtering.

Preferably, a deposition by PVD will be carried out.

Still more advantageously, the plasma treatment may be carried out in situ in the deposition machine.

The neutral gas may be argon or nitrogen. Preferably, it consists of argon.

This process for preparing the surface is particularly advantageous in the case of a part made of carbon.

According to a first variant, the second part 200 is also prepared with the previously-described preparation method. For example, to assemble two carbon parts 100, 200, the surface of the two parts may be prepared with the previously-described preparation method.

According to another variant, the method for preparing the surface of the second part 200 may comprise the following steps: (FIG. 3):
carrying out a surface treatment of the second part 200 by ion etching, so as to form an active surface,
depositing a gold layer 210 preferably having a thickness of 50 to 100 nm, over the active surface.

The gold layer 210 will be rapidly dissolved in the solder as soon as the latter becomes liquid.

This variant is advantageous in the case of a second metal part 200 titanium-based, nickel-based or made of CoCr.

The metal part may be covered with a thin native oxide layer which does not allow for a good wetting by the solder at low temperature (<450° C.). Nonetheless, the reactivity at the interface is good enough to ensure a good adhesion of the solder.

Figure 4:
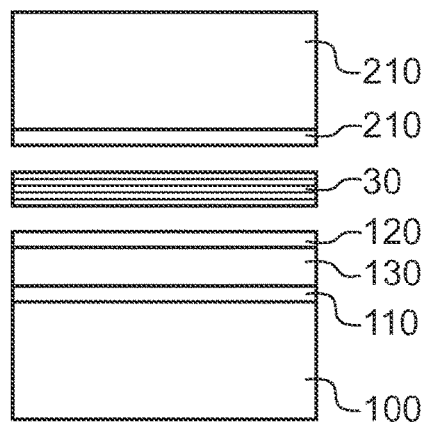
FIG. 4 schematically shows, in section, two parts to be brazed and a supply of solder in a so-called "sandwich" configuration before assembly, according to a particular embodiment of the invention.

Afterwards, the first part 100 and the second part 200 are assembled (FIG. 4).

Advantageously, the solder 30 (also called filler material or brazing alloy) is a non-active solder. Preferably, the solder is a tin solder or a solder made of a tin alloy. Preferably, the tin alloy is selected from among SnIn, SnAg (96.5Sn-3.5Ag) and SnAgCu (96.5% Sn 3% Ag 0.5% Cu).

The solder 30 is positioned between the two parts 100, 200 to be assembled, and more particularly between the two gold layers 120, 210 (step iii).

After heating (step iv), and cooling (step v), an assembly is obtained having good mechanical properties. The parts 100, 200 are assembled by a solder joint devoid of cracks.

Although this is in no way limiting, the invention finds particular applications in the medical field to manufacture biocompatible implants. For example, the implant may be formed of the following two parts (or portions):
a first part made of carbon and in particular of graphite coated with PyC or of a C/C composite coated with PyC, and
a second metal part, for example of titanium, of TA6V or of CrCo.

For example, these implants (prostheses) may have surfaces to be brazed in the range of 20 cm².

Illustrative and Non-Limiting Examples of One Embodiment

In this example, several torsion specimens have been made by assembling a part made of carbon and a metal part by means of a low-temperature solder.

The metal part has been machined in the form of a 20 mm long and 10 mm diameter rod. It is made of a Co based alloy (UNS R30008) whose composition is given in the following table:

| Element | w % |
|---|---|
| Co | 39.0 to 42.0 |
| Cr | 18.5 to 21.5 |
| Fe | base |

-continued

| Element | w % |
|---------|-----|
| Ni | 15.0 to 18.0 |
| Mo | 6.5 to 7.5 |
| Mn | 1.0 to 2.0 |

The carbon part, denoted G/PyC, is a POCO graphite disc coated with pyrolytic carbon PyC (~200 μm) with a diameter of 21 mm and a height of 3 mm.

The solder (or brazing alloy) is a SnAg tin-based alloy. Its composition is 96.5Sn-3.5Ag (by mass), its melting point is close to that of tin (232° C.). For example, such an alloy is commercialized in the form of a strip of different thicknesses by the company Indium Corporation under the trade name Indalloy-121. In these examples, the strip has a thickness of 100 μm.

Metallisation of the Parts Made of G/PVC and of the Parts Made of CoCr:

In a first step, the carbon parts and the metal parts are cleaned in an ultrasonic tank with acetone then ethanol and then dried with compressed air.

In the following examples, the parts are covered afterwards by masks made of metal (preferably made of stainless steel) to limit the metallisation area to the assembly surface.

Then, the parts covered with the masks are positioned in the enclosure of a PVD machine, then the system is pumped up to $5 \times 10^{-7}$ mbar.

Afterwards, the parts are treated in the machine by Ar plasma in order to thoroughly clean their surfaces and form an active surface in order to improve the adhesion of the subsequent metal deposit (50 W, 120 s). Then the parts are metallised.

Example 1: Metallisation of a Part Made of G/PyC by Ti/Au (FIG. 1)

The parts 100 are made of G/PyC.

A 500 nm adhesion layer 110 made of an active element (Ti) is deposited over the active surface 101 of the part 1000 at a speed of 0.3 nm/s in the PVD enclosure.

Then, a 100 nm thick coating layer 120 made of a non-active element (Au) is deposited to protect the thin film of Ti from oxidation and improve wetting.

Example 2: Metallisation of a Part Made of G/PyC by Ti/W/Au (FIG. 2)

The parts 100 are made of G/PyC.

A 30 nm adhesion layer 110 made of Ti is deposited over the active surface 101 of the part 100 at a speed of 0.3 nm/s in the PVD enclosure.

Then, a 100 nm thick barrier layer 130 made of W is deposited to block the diffusion and the dissolution of the adhesion layer 110 in the solder. This barrier layer 130 avoids the dissolution of the active element layer.

Finally, a 100 nm thick final layer 120 made of a non-active element (Au) is made to protect the deposit from oxidation and improve wetting.

Figure 3:
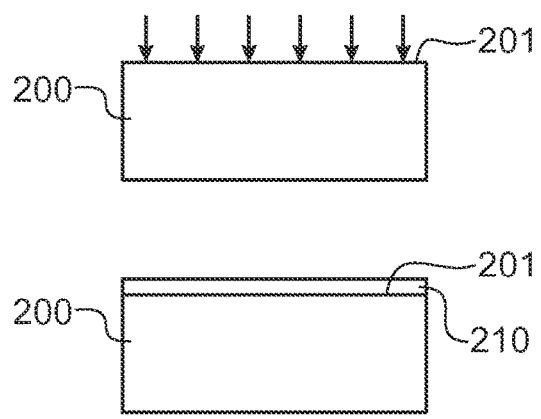
FIG. 3 schematically shows different steps of a method for preparing a part, preferably metallic (for example based on Ti, Ni or CoCr) for brazing, according to another particular embodiment of the invention.

Example 3: Metallisation of a Part Made of CoCr by Au (FIG. 3)

The parts 200 are made of CoCr.
A 100 nm thick layer 210 made of a non-active element (Au) is deposited to improve wetting at low temperature.

Assembly (FIG. 4):

The metallised parts 100 made of G/PyC and the metallised parts 200 made of CoCr are assembled without any additional cleaning.

A solder 30 in the form of a foil or strip is cut out with a punch and cleaned in an ultrasonic bath with acetone and then ethanol.

Figure 5:
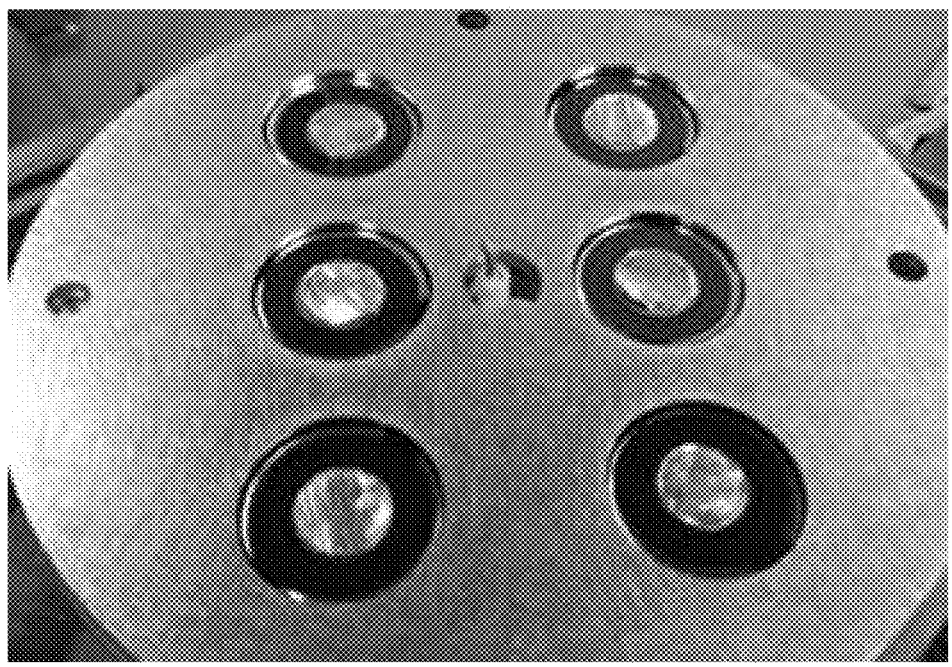
FIG. 5 is a photograph of different parts made of graphite coated with PyC and metallised, and positioned in a holding tool, in a brazing furnace, according to a particular embodiment of the invention.
Figure 6:
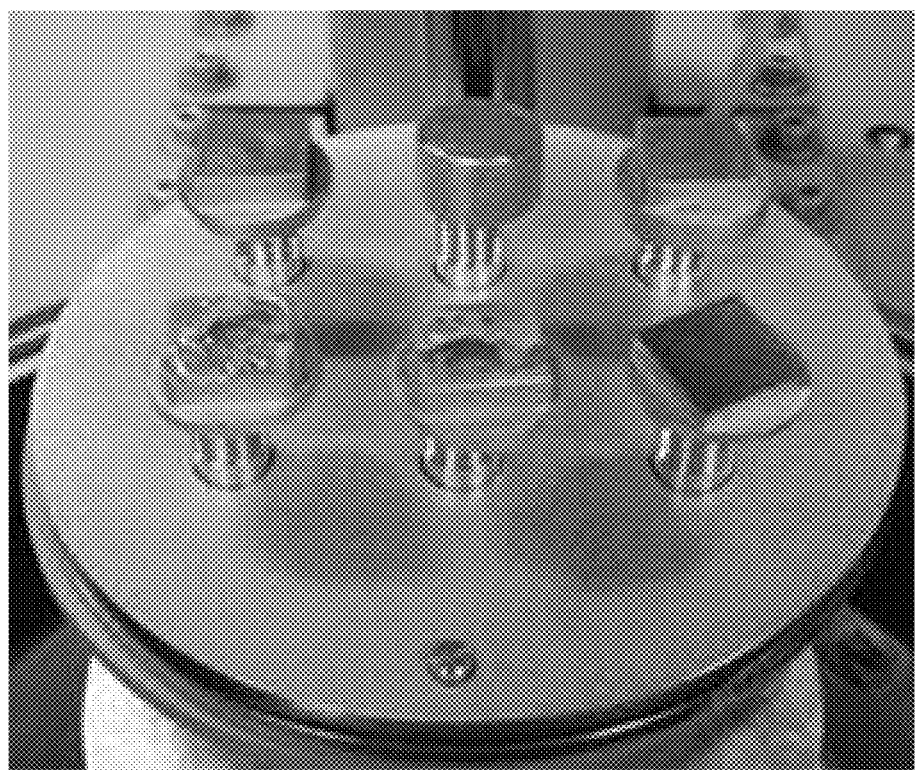
FIG. 6 is a photograph of graphite parts coated with PyC and metallised with a TiAu bilayer formed by PVD, covered with solder foils, on which TA6V rods metallised with a TiWAu trilayer formed by PVD have been positioned, the sets thus formed being held in a tooling, in a brazing furnace, according to another particular embodiment of the invention.

Afterwards, the solder 30 is positioned over the carbon part 100 (FIG. 5), then the metal part 200 is brought into contact with the solder 30. The assembly is held in a tool (FIG. 6), then placed in a furnace under secondary vacuum. A mass is added to apply a pressure (typically 15 to 20 g/cm$^2$) over the area to be brazed.

The assembly is heated up to a set temperature, higher than the melting point of the solder (350° C., in this case) for a hold time period of a few tens of minutes (10 to 15 min).

Figure 7:
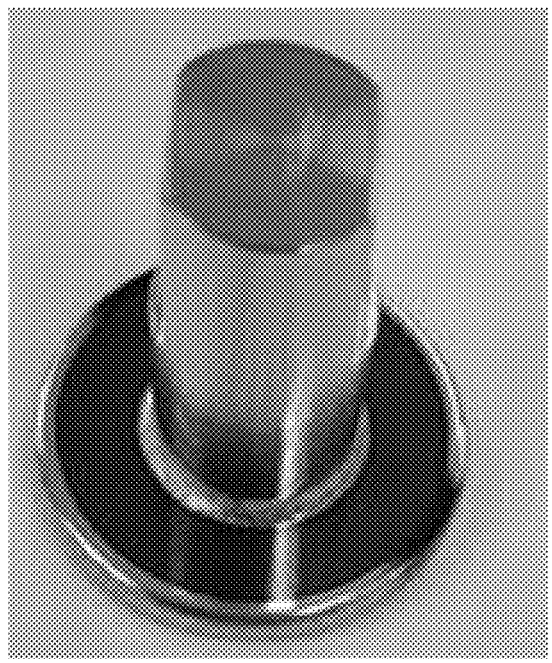
FIG. 7 is a photograph of a torsion specimen obtained by assembling by brazing a part made of graphite coated with PyC and metallised by a TiAu bilayer formed by PVD and a part made of CoCr metallised by a gold layer obtained by PVD, with a SnAg solder, according to another particular embodiment of the method of the invention.

After cooling, the assembly is taken out of the furnace. The parts are secured (FIG. 7).

Mechanical Torsion Tests:

The assemblies thus obtained by brazing are subjected to different mechanical torsion tests. The tests have been carried out at room temperature (typically 20 to 25° C.) with an electromechanical tension machine commercialized by the MTS Systems Corporation. The rotation of the chuck is actuated by the movement of the crosspiece (0.5 mm/min).

The maximum tangential stresses (at break-up) are calculated by the following formula:

$$\tau_{max} = \frac{2}{\pi R^S} * F * C$$

wherein F is the applied maximum force; R is the radius of the torsion axis and C the radius of the torsion pin.

The following table lists the results of the mechanical torsional strength for the different tests that have been carried out.

| Example | Substrate | Metal part | Solder | Stress (MPa) |
|---------|-----------|------------|--------|--------------|
| 1a | G/PyC (Ti, Au) | CoCr (Au) | Sn3.5Ag | 29.7 |
| 1b | G/PyC (Ti, Au) | CoCr (Au) | Sn3.5Ag | 34.6 |
| 1c | G/PyC (Ti, Au) | CoCr (Au) | Sn3.5Ag | 38.9 |
| 1d | G/PyC (Ti, Au) | CoCr (Au) | Sn3.5Ag | 41.8 |
| 1e | G/PyC (Ti, Au) | CoCr (Au) | Sn3.5Ag | 31.1 |
| 2a | G/PyC (Ti, W, Au) | CoCr (Au) | Sn3.5Ag | 25.3 |
| 2b | G/PyC (Ti, W, Au) | CoCr (Au) | Sn3.5Ag | 24.2 |
| 2c | G/PyC (Ti, W, Au) | CoCr (Au) | Sn3.5Ag | 22.8 |

Figure 8:
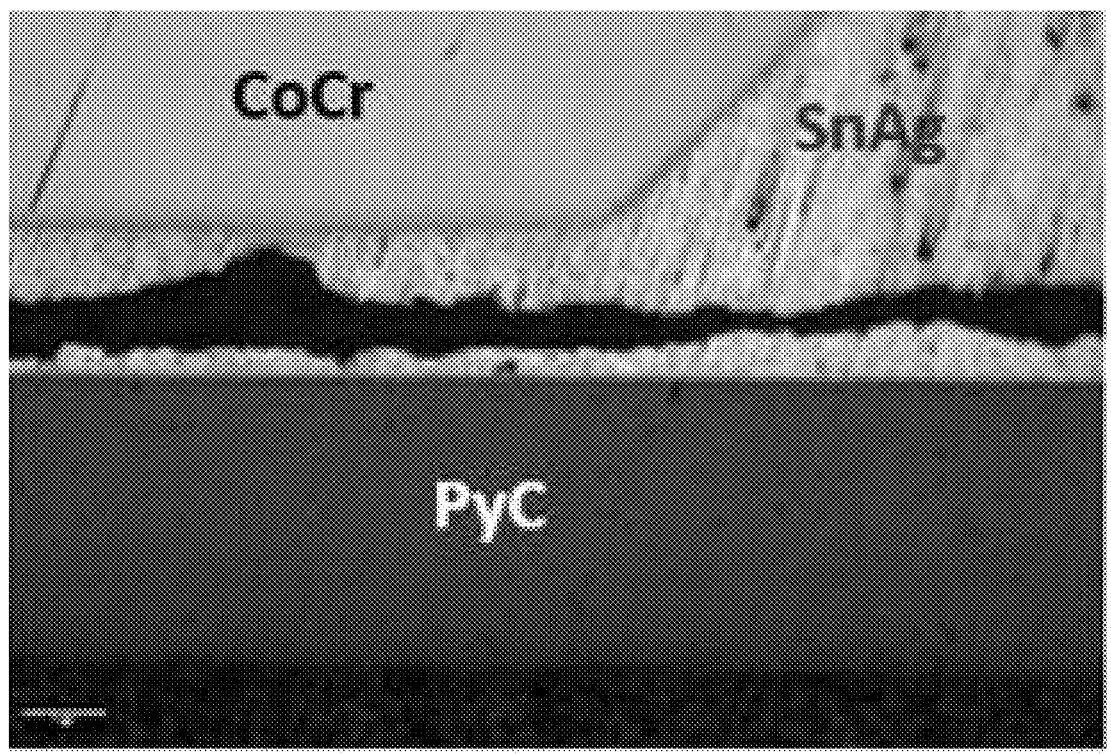
FIG. 8 is an optical photograph of the joint of the torsion specimen obtained by assembling by brazing a part made of graphite coated with PyC and metallised by PVD with TiAu and a part made of CoCr metallised with a gold layer formed by PVD after a mechanical torsion test, according to another particular embodiment of the method of the invention.

The maximum tangential stresses (at break-up) obtained for the carbon parts with the Ti/Au deposit (1a to 1e) are higher than or equal to 30 MPa and go up to 41.8 MPa, confirming the solidity of the obtained brazing joint. Break-up is essentially cohesive and occurs in the solder (FIG. 8).

The metallisation of the carbon part with the Ti/Au deposit ensures better mechanical strength thanks to excellent adhesion of the solder to the Ti layer. Break-up occurs in the solder with values corresponding to the strength of the solder itself.

As regards the carbon parts with the Ti/W/Au deposit (2a to 2c), the maximum tangential stresses (at break-up) are higher than or equal to 22.8 MPa. Break-up is essentially adhesive and occurs at the solder/W layer interface.

What is claimed is:

1. A method for assembling a first part and a second part by brazing, comprising the following steps:

i) preparing a first part made of carbon, a titanium-based material, a nickel- based material or a CoCr alloy according to the following sub-steps a) to d):
a) providing the first part made of carbon, titanium-based, nickel-based or made of a CoCr alloy,
b) carrying out a plasma treatment with a neutral gas, on the first part whereby the part is cleaned and an active surface is formed on the part,
c) depositing a first layer comprising an active element over the active surface of the first part, the active element being a carbide-forming element,
d) depositing a second layer made of gold over the first layer, whereby the first layer is protected from oxidation and wetting of a filler material is improved during heating;
ii) preparing a second part made of carbon, a titanium-based material, a nickel-based material or a CoCr alloy, the second part being, advantageously, prepared according to sub-steps a) to d) as defined in step i);
iii) bringing the filler material into contact with the first part and with the second part whereby an assembly is obtained;
iv) heating the assembly obtained at the step iii) up to an assembly temperature higher than the melting temperature of the filler material, so as to melt the filler material, and maintaining the assembly temperature for a hold time period, the assembly temperature being lower than 450° C.;
v) cooling the assembly so as to form a solder joint between the first part and the second part, whereby the parts are assembled.

2. The method according to claim 1, wherein the active element is Ti, Cr or Zr.

3. The method according to claim 1, wherein the first layer has a thickness of 300 µm to 500 µm.

4. The method according to claim 1, wherein the method comprises a step e), between step c) and step d), during which a third layer of a non-active element is deposited.

5. The method according to claim 4, wherein the first layer has a thickness of 30 to 50 nm and in that the third layer has a thickness of 100 to 500 nm.

6. The method according to claim 1, wherein the first layer also comprises a non-active element deposited simultaneously with the active element during step c).

7. The method according to claim 4, wherein the third layer has a thickness of 50 to 100 nm.

8. The method according to claim 1, wherein the filler material is tin or a tin-based alloy.

9. The method according to claim 8, wherein the assembly temperature is between 250° C. and 320° C.

10. The method according to claim 1, wherein the first part is a graphite substrate covered with pyrolytic carbon and in that the second part is made of a CoCr alloy.

11. The method according to claim 4, wherein the non-active element is W or Nb.

12. The method according to claim 6, wherein the non-active element is W or Nb.

13. The method according to claim 8, wherein the tin-based alloy is SnAg, SnCu or SnIn.

* * * * *